United States Patent [19]
Suzuki et al.

[11] Patent Number: 4,885,449
[45] Date of Patent: Dec. 5, 1989

[54] ELECTRIC DISCHARGE MACHINE

[75] Inventors: Toshio Suzuki; Takuji Magara, both of Aichi, Japan

[73] Assignee: Mitsubishi Denki Kabushiki Kaisha, Tokyo, Japan

[21] Appl. No.: 224,852

[22] PCT Filed: Oct. 23, 1987

[86] PCT No.: PCT/JP87/00815
   § 371 Date: Aug. 5, 1988
   § 102(e) Date: Aug. 5, 1988

[87] PCT Pub. No.: WO88/03074
   PCT Pub. Date: May 5, 1988

[30] Foreign Application Priority Data

| Oct. 24, 1986 | [JP] | Japan | 61-252928 |
| Oct. 24, 1986 | [JP] | Japan | 61-252929 |
| Oct. 24, 1986 | [JP] | Japan | 61-252931 |
| Oct. 24, 1986 | [JP] | Japan | 61-252932 |
| Oct. 24, 1986 | [JP] | Japan | 61-252933 |
| Oct. 24, 1986 | [JP] | Japan | 61-252934 |
| Oct. 24, 1986 | [JP] | Japan | 61-252935 |
| Oct. 24, 1986 | [JP] | Japan | 61-252936 |
| Oct. 24, 1986 | [JP] | Japan | 61-252939 |
| Oct. 24, 1986 | [JP] | Japan | 61-252941 |

[51] Int. Cl.$^4$ .................... B23H 1/00; B23H 7/06; B23H 7/32

[52] U.S. Cl. .................... 219/69.11; 219/69.12; 318/632

[58] Field of Search .............. 219/69 M, 69°W, 69 C, 219/69 R, 69 G, 69.12, 69.17, 69.13, 69.1, 69.16, 69.11; 318/632, 646, 634

[56] References Cited

U.S. PATENT DOCUMENTS

| 3,708,736 | 1/1973 | Hoshina et al. | 318/632 |
| 4,392,195 | 7/1983 | Inoue | 219/69 W |
| 4,559,434 | 12/1985 | Kinoshita | 219/69 C |
| 4,622,449 | 11/1986 | Inoue | 219/69 R |
| 4,703,143 | 10/1987 | Okubo et al. | 318/646 |

FOREIGN PATENT DOCUMENTS

| 49153 | 4/1982 | European Pat. Off. | 318/632 |
| 51-90083 | 6/1976 | Japan . | |
| 53-06783 | 1/1978 | Japan . | |
| 123674 | 9/1979 | Japan | 318/634 |
| 221221 | 11/1985 | Japan | 219/69 W |
| 168426 | 7/1986 | Japan | 219/69 W |
| 82-01601 | 5/1982 | PCT Int'l Appl. | 318/634 |
| 85-01366 | 3/1985 | PCT Int'l Appl. | 318/634 |

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

In an electric discharge machine in which electric discharge is cause to take place between a workpiece (6) and an electrode (1) such as a wire electrode or die sinking electrode which are confronted through a machining solution (7) with each other with a small gap therebetween while the electrode (1) and the workpiece (6) are moved relative to each other with drive shafts (37 and 67) such as ball screws, so that the workpiece (6) is machined as required; correcting data for the amounts of movement of the drive shafts are obtained under a plurality of different load conditions or temperature conditions and stored in a memory (41) in advance, and out of the correcting data thus stored, the most suitable ones for actual machining conditions are selected, so that amounts of movements to given to the drive shafts (37 and 67) are corrected according to the correcting data thus selected, whereby, even when the drive shafts (37 and 67) are expanded or contracted by the ambient temperature or deformed by a load such as the weight of the workpiece (6) or machining solution (7), the amounts of movement of the drive shafts (37 and 67) can be accurately corrected; that is, the relative position of the workpiece (6) and the electrode (1) is accurately corrected so that the workpiece is machined with high accuracy.

8 Claims, 6 Drawing Sheets

| LOAD | TEMPER-ATURES | AXIS | POSITION | DIRECTION | SIGN | CORRECTING VALUES |
|------|---------------|------|----------|-----------|------|-------------------|
| 5kg  | 15°C          | X    | 0 0 0 5  | +         | −    | 0 0 0 1           |
|      |               | Y    |          |           |      |                   |
| 5kg  | 20°C          | X    |          |           |      |                   |

ELECTRIC DISCHARGE MACHINE

DESCRIPTION

1. Technical Art

This invention relates to an electric discharge machine, and more particularly to an improvement of the accuracy of feed thereof.

2. Background Art

FIG. 1 is a front view showing a general wire cut electric discharge machine. In FIG. 1, reference numeral 1 designates a wire electrode; 2, a wire electrode supplying bobbin; 3, wire electrode withdrawing rollers; 4, a wire electrode withdrawing box for withdrawing a wire electrode used; 5, a brake roller; 6, workpiece; 7, a machining solution; 8, machining-solution supplying nozzles; 9, a machining tank containing the machining solution 7; 10, a central control unit; 11, an X-table moving along the X-axis in a horizontal plane; 12, a Y-table moving along the Y-axis perpendicular to the X-axis; 13, a surface table on which a workpiece is mounted, the surface table 13 being fixedly secured to the Y-table 12; 14, an electric motor for driving the X-table 11; 15, an encoder for detecting an amount of drive of the X-table driving motor 14; 16, X-table moving guides in the form of rails which are provided on a bed 20 (described later); 17, an electric motor for driving the Y-table 12; 18, an encoder for detecting an amount of drive of the Y-table driving motor 17; 19, Y-table moving guides; 20, the bed on which the X-table 11 and the Y-table 12 are mounted; 21, a vertical Z-shaft; 22, a driving electric motor for moving the Z-shaft 21 vertically; 23, an encoder for detecting an amount of drive of the Z-shaft driving motor 22; 24, a guide for moving the Z-shaft 21; and 25, a taper machining device.

FIG. 2 is perspective view showing an X-table moving mechanism. In FIG. 2, reference numeral 27 designates a speed reducer for reducing the speed of rotation of the X-table driving motor 14; 28, a ball screw driven through the speed reducer by the motor 14; 29, a nut engaged with the ball screw; 30, sliders moving along the guides 16; and 32 and 33, wire guides provided in the nozzles 8, respectively. FIG. 3 shows a device for correcting the amounts of drive of the drive shafts.

The operation of the wire cut electric discharge machine thus constructed will be described. In FIG. 1, the wire electrode 1 is supplied from the wire electrode supplying bobbin 2, and withdrawn by the wire electrode withdrawing rollers 3, so that the wire electrode 1 used is put in the wire electrode withdrawing box 4. In this operation, the wire electrode 1 is held under predetermined tension by means of the brake roller 5. Electric energy is applied between the wire electrode 1 and the workpiece 6 by an electric power source (not shown), so that an electric discharge takes place between the wire electrode 1 and the workpiece 6 to machine the latter 6. The machining solution 7 is supplied to the gap between the wire electrode 1 and the workpiece 6, namely, an inter-electrode gap through the machining solution supplying nozzles 8, for the purpose of insulation and cooling. Sometimes, the machining solution 7 is put in the machining tank 9, so that the workpiece is machined while being kept immersed in the machining solution 7.

A desired machining configuration has been programmed in the main memory of the central control unit 10. In response to instructions from the central control unit 10, the drive shafts are driven so that the X-table 11 and the Y-table 12 are moved, as a result of which the workpiece 6 mounted on the surface table 13 is moved relative to the wire electrode 1 so that the workpiece is machined as if cut with a fret sawing machine. The X-table 11 and the Y-table 12 are moved along the table moving guides 16 and 19 by the driving motors 14 and 17, respectively. The guides 16 for the X-table 11 are secured to the bed 20, and the guides 19 for the Y-table 12 are secured to the X-table 11. The position data of the X-table 11 and the Y-table 12 are applied to the central control unit 10 by the encoders 15 and 18. When it is required to taper the workpiece, the taper machining device is driven to move the upper wire electrode guide 32 along the U-axis in a horizontal plane or along the V-axis perpendicular to the U-axis, so that the workpiece is machined with the wire electrode 1 included.

The movement of the X-table 11 will be described in more detail. FIG. 2 shows the X-table moving mechanism. The X-table driving motor 14 is coupled to the ball screw 28 through the speed reducer 28 secured to the X-table 11. The nut 29 mounted on the ball screw 28 is fixedly secured to the bed 20. Therefore, as the ball screw 28 is turned, the ball screw 28 is moved in its longitudinal direction, and therefore the holder 31 supporting the ball screw rotatably and the speed reducer 27 together with the X-table are moved along the X-table moving guides 16 with the aid of the sliders 30. In this operation, the amount of movement of the X-table 11 is detected by the encoder 15. Even if, in this case, the X-table driving motor 14 makes a predetermined number of revolutions so that the output of the encoder 15 coincides with the X-table movement instruction value, the X-table may be, in practice, fed excessively or insufficiently depending on the accuracy of the ball screw 28 or the deformation and strain of the mechanical structures such as the bed 20 and the guides 16 which are caused by the movement of load.

The accuracy of feed is lowered by the fluctuation in thread pitch of the ball screw 28 and by the deformation of the ball screw 28. The deformation of the ball screw takes place when the weight of the workpiece or the weight of the machining solution in the machining tank 9 is applied through the X-table 11 or Y-table 12 to the ball screw 28, or when the ball screw expands or contracts in pitch with the ambient temperature. Errors due to the fluctuation in pitch of the ball screw 28 are called "pitch errors".

When the direction of feed of the X-table 11 or Y-table 12 is reversed, the direction of rotation of the ball screw 28 is also reversed. Therefore, when the direction of feed of the X-table 11 or Y-table 12 is reversed, the X-table or Y-table is fed excessively or insufficiently because of the change in backlash of the ball screw.

The excessive or deficient amounts of feed due to the pitch error and backlash of the ball screw are values inherent in the positions of the X-table 11 or Y-table 12. Therefore, the following method is employed: The excessive or deficient amounts of feed are measured with a laser length measuring machine in advance, and the positions of the X-table 11 and the Y-table 12 and correction data for correcting the excessive or deficient amounts of feed in compliance with the pitch error and backlash are stored in the control device 10, so that, in feeding the X-table 11 or Y-table 12, the excessive or deficient amount of feed is corrected.

As was described above, in the conventional electric discharge machine, one set of pitch error data measured for each of the X-axis and Y-axis under one condition is used at all times. This method is disadvantageous in the following points: In practice, the weight of the workpiece 6 and the quantity of the machining solution 7 change the loads of mechanical structures such as the bed 20, the guides 16 and 19 and the ball screw 28, and the mechanical structures may be thermally deformed with the increasing or decreasing ambient temperature. Accordingly, the amount of deformation or strain affecting the accuracy of feed is not always constant. Therefore, employment of one set of drive shaft pitch error correcting data and backlash correcting data measured for each of the X-axis and Y-axis under the one particular condition may result not only in an incorrect correction of feed but also in an increase of the error.

An object of this invention is to eliminate the above-described difficulties. More specifically, an object of the invention is to provide an electric discharge machine in which, when the loads of the mechanical structures are affected by the weight of the workpiece or the quantity of the machining solution, or when the ambient temperature of the mechanical structures changes, the amounts of drive of the drive shafts is accurately corrected so that the accuracy of feed is improved, whereby the workpiece is machined with high accuracy.

An electric discharge machine according to the invention comprises: memory means for storing correcting data which are obtained under various conditions; selecting means for selecting suitable one out of the correcting data thus stored; and instructing means for giving the correcting data selected by the selecting means to a drive control device.

BRIEF DESCRIPTION OF THE DRAWINGS

FIG. 3 is a diagram showing a control system for the embodiment.

FIG. 4 is an explanatory diagram for a description of the automatic select operation of correcting data.

FIG. 5 is an explanatory diagram showing one example of a data table stored in a main memory in FIG. 3.

FIG. 6 is a graphical representation indicating relationships between the deflection and the load of a ball screw in the embodiment.

FIG. 7 is an explanatory diagram for a description of the manual select operation of the correcting data and one example of a picture displayed on a CRT.

FIG. 8 is a perspective view showing essential parts of the embodiment, for a description o a taper machining operation.

FIG. 9 is an enlarge view showing a taper machining device and the lower part of a Z-shaft.

BEST MODE FOR CARRYING OUT THE INVENTION

Embodiments of this invention will be described.

Figure 3:
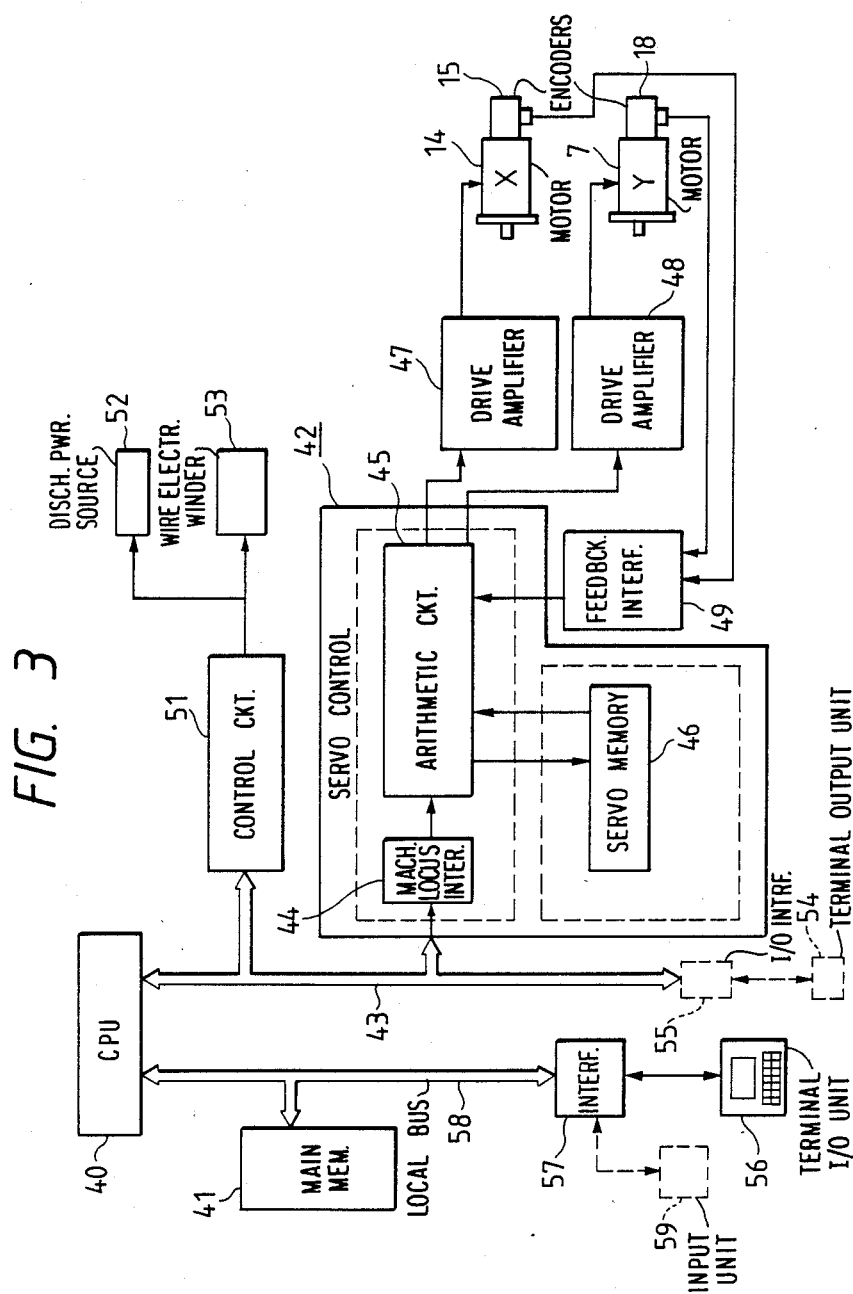
FIGS. 3 through 7 shows a first embodiment of this invention.

FIG. 3 shows a first embodiment of this invention. In FIG. 3, reference numeral 40 designates a main CPU (central processing unit); 41, a main memory in which a number of pieces of correcting data and machining programs for machining configurations are stored; 42, a servo control device comprising: a circuit 44 which, in response to a movement instruction applied thereto through a system bus 43 by the main CPU 40, provides a machining locus interpolation instruction; an arithmetic circuit 45 which receives the output of the circuit 44 to calculate an amount of movement in the X-axis direction and an amount of movement in the Y-axis direction; and a servo memory 46 which stores those suitable for selected machining conditions of the correcting data stored in the main memory 41. Reference numerals 47 and 48 designate a drive amplifier for driving the X-table driving motor 14 and a drive amplifier for driving the Y-table driving motor 17, respectively.

Further in FIG. 3 reference numerals 49 and 50 designate feedback interfaces which detect the amounts of rotation of the X-table driving motor 14 and the Y-table driving motor 17 and apply the amounts of rotation thus detected, as position data, to the arithmetic circuit 45, respectively; 51, a control circuit for controlling a discharging power source 52 and a wire electrode winding device 53; 54, a terminal output unit such as a paper tape puncher which outputs data through an input/output interface 55; 56, terminal input/output unit connected through a standard interface 57 and a local bus 58 to the main CPU 40, the terminal input/output unit allowing the operator to perform the input and output operation while watching the conventional CRT screen; and 59, an input unit such as a paper tape reader.

Figure 1:
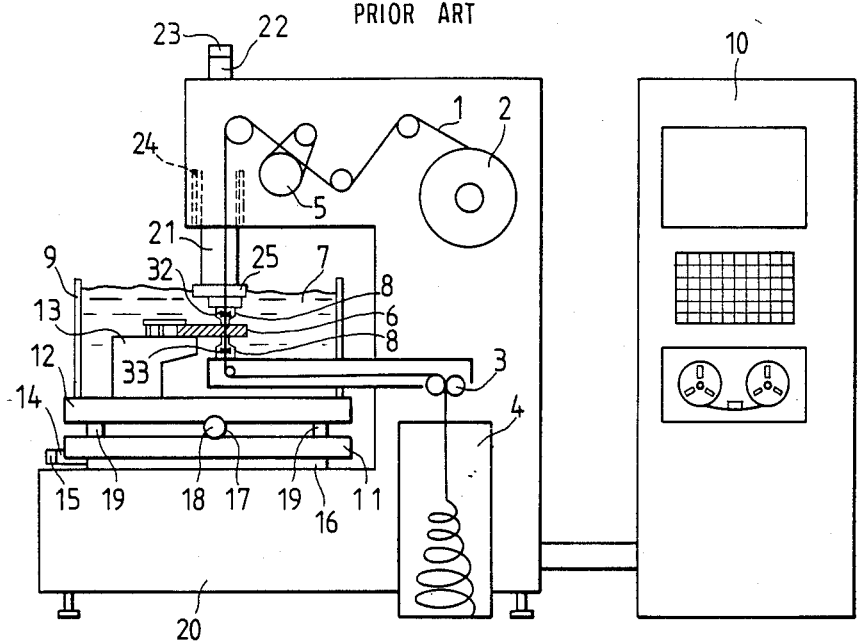
FIG. 1 is a side view, partly as a sectional view, showing the arrangement of a general wire-electrode-operated electric discharge machine.
Figure 2:
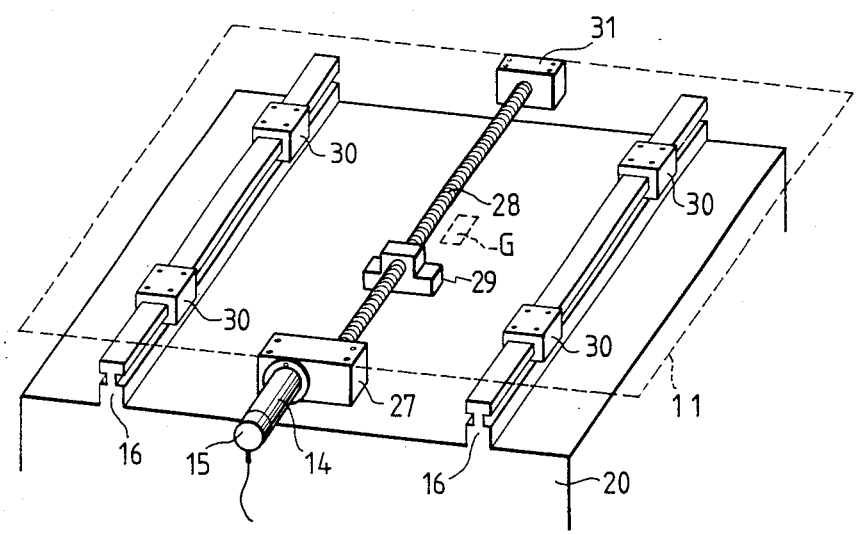
FIG. 2 is an enlarged perspective view essentially showing components concerning the X-table in the machine.

The other arrangement is the same as that of the electric discharge machine shown in FIGS. 1 and 2.

Figure 4:
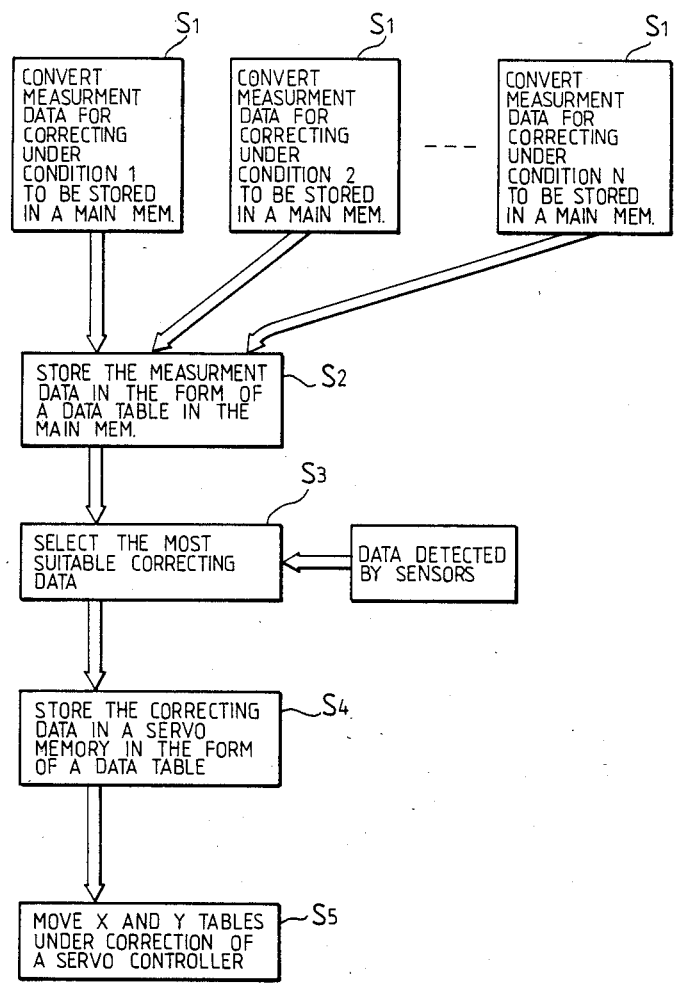
Figure 7:
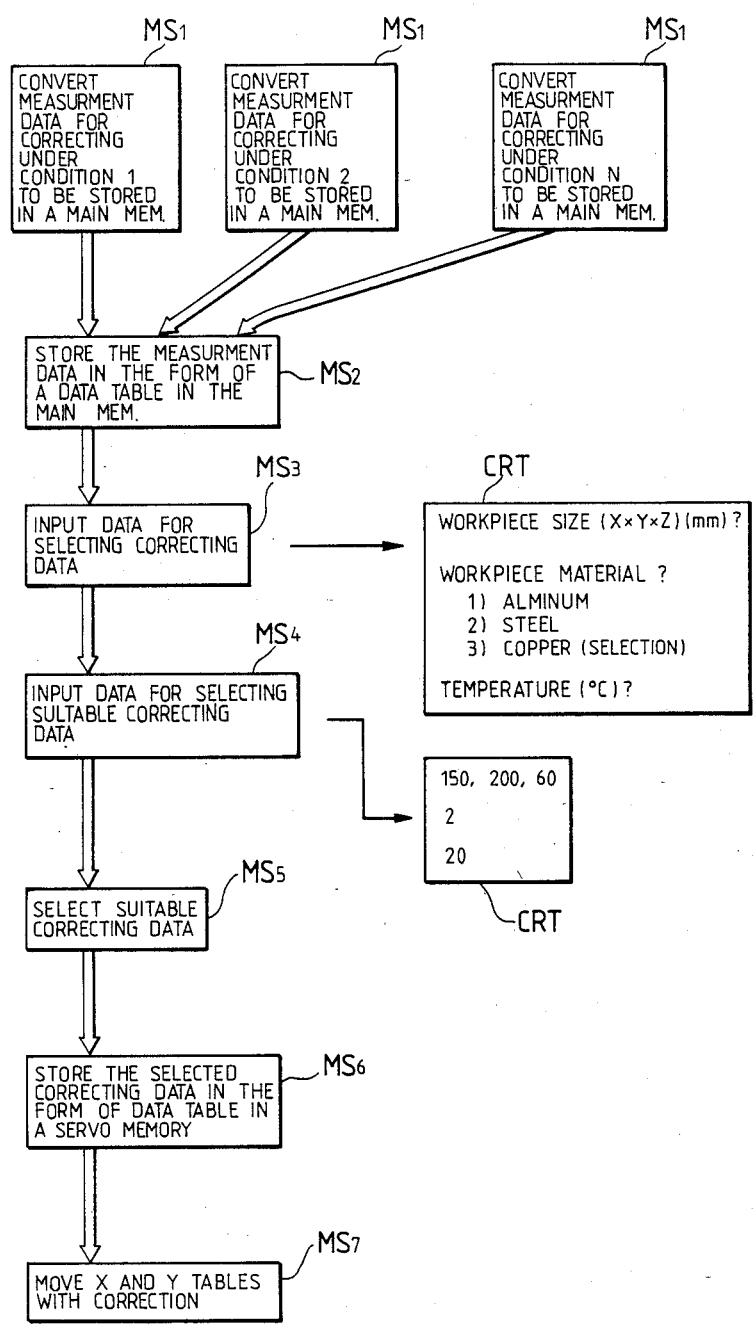

The operation of the embodiment shown in FIG. 3 will be described. In the embodiment, fundamentally an automatic select operation as shown in FIG. 4 and a manual select operation as shown in FIG. 7 can be selectively effected.

First, the automatic select operation of the embodiment will be described. In advance, a variety of combinations of workpiece weights, machining solution quantities and ambient temperatures are provided. For each of the combinations of these data, an pitch error or backlashes accurately measured with a conventional laser length measuring machine or the like. The pitch errors or backlashes thus measured and the positions at the measurements are converted into data which can be stored in the main memory 41 (Step $S_1$ in FIG. 4). In Step $S_2$, the above-described measurement data are stored, in the form of a data table, in the main memory 41 with the aid of the input unit 59.

It is preferable that a pitch error or backlash is measured every time the table is moved several millimeters in the directions of the X- or Y-axis; that is, it is desirable to measure pitch errors or backlashes as many and fine as possible, because the pitch error or backlash depends on the position of the X-table 11 or Y-table 12.

Figures 5, 6:
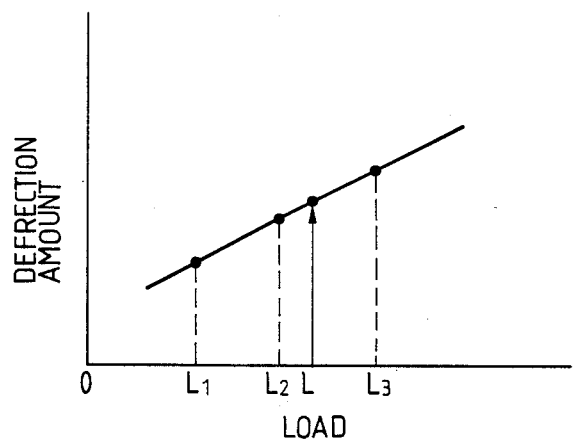

For instance, a table of correcting data (correcting values) as shown in FIG. 5 is stored in the main memory 41. It should be noted that the data table shown in FIG. 5 is different in storage form from what is actually stored.

Upon application of an instruction for starting a machining program, in Step S3 load and temperature data are inputted into the main CPU with the aid of a temperature sensor and a load sensor, and the main CPU selects the most suitable correcting data out of the data table in the main memory 41 according to the input data. The selection is made for instance as follows: An analog data indicating a load is converted into a digital data which is operated in the main CPU 40, and out of the data in the item "LOAD" of the correcting data stored in the main memory 41, the one which is the smallest in the difference from the load detected is selected; for instance, "Load 5 Kg" is selected. Similarly, temperature data outputted by the temperature sensor is operated in the main CPU 40, and out of the data in the item "TEMPERATURE" of the correcting data, the one which is the smallest in the difference from the temperature detected is selected; for instance, "Temperature 15° C." is selected.

According to the combination of the load and temperature thus selected, the best correcting values are selected for Xaxis and Y-axis, the correcting values thus selected are transferred into the servo memory 46, where they are stored in the form of a data table, in the following Step $S_4$.

Upon start of the machining program, in Step $S_5$ the arithmetic circuit 45 interpolates movement instructions to operate outputs to be applied to the drive amplifiers, and compares at all times mechanical coordinates provided by the feedback interface 49 receiving rotational position data from the encoders 15 and 18 with the correcting data table stored in the servo memory 46, so that, for coordinates to be corrected, correcting values adjusted are outputted. Therefore, the X-table 11 and the Y-table 12 are fed accurately in the X-axis direction and in the Y-axis direction, respectively. The correction data table thus selected is used until the end of the machining program.

The correcting data table includes data representing positive and negative feed directions Therefore, in the case also when the feed direction is reversed, the correcting data are used. In selecting correcting data table shown in FIG. 5, the deflection of the ball screw 28 due to to load, and the expansion or contraction of the ball screw 28 due to temperature can be represented by a linear relation between load and temperature as shown in FIG. 6. Therefore, the main CPU 40 should be so programmed that, in the case where the correcting data table includes loads $L_1$, $L_2$ and $L_3$ as shown in FIG. 6, the load detected is within a range from $L_2$ to $L_3$, $L_2$ is selected.

In the case where the load detected is just at the middle between $L_2$ and $L_3$, the main CPU should be so programmed that only one of the two values $L_2$ and $L_3$ is selected.

In the above-described case, correcting data are determined from two different factors, load and temperature. In addition, the following method may be employed: For instance, one and the same factor is detected with a plurality of sensors, and the average value of the results of detection is obtained for selection of the suitable correcting data. Furthermore, the load detecting means may be a strain gauge G which is provided near the ball screw 28 as indicated by the broken line in FIG. 2, and in the case where the machining operation is carried out with the workpiece immersed in the machining solution, the load detecting means may be a solution level detecting meter because the load of the mechanical structures depends greatly on the weight of the machining solution. The temperature measuring means may be a thermocouple which is provided at the position of the strain gauge G in FIG. 2.

First, in Step $MS_1$, correcting data are detected similarly as in the above-described Step $S_1$ of FIG. 4, and in the next Step $MS_2$ they are stored, in the form of a data table, in the main memory 41 similarly as in the above-described case. In this case, the correcting data are stored with calling numbers. In Step $MS_3$, a correcting data selecting picture is displayed on the CRT screen of the terminal input/output unit 56. The picture, as shown in FIG. 7, can be used to select a workpiece size, a workpiece material, and a room temperature.

In Step $MS_4$, the operator operates the terminal input/output unit 56 to input a workpiece size, workpiece material, etc. by referring to the picture displayed on the CRT. For instance when a workpiece size of 150 mm×200 mm×60 mm, a workpiece material of aluminum, and a room temperature of 20° C. are inputted, the main CPU 40 calculates the weight of the workpiece. The weight thus calculated corresponds to the load of the mechanical structure. Therefore, in the next Step $MS_5$, a calling number is specified, so that similarly as in the above-described Step $S_3$, suitable correcting data are read out of the main memory 41.

The correcting data thus selected are transferred to and stored in the servo memory 46 in Step $MS_6$. Upon start of the program, in Step $MS_6$, the servo control device 42 issues movement control instructions for the X-table 11 and the Y-table 12 while correcting the amounts of movement thereof.

In this connection, the following method may be employed: The data table stored in the main memory 41 is displayed on the CRT screen (CRT), so that the operator can determine the correcting data in the data table which are the most suitable for the machining conditions. According to the determination, the correcting data are called so as to be stored in the servo memory 46.

The central control device 10 includes at least the main CPU 40, the again memory 41, the servo control device 42, the input/output interface 55, and the standard interface 57, which are formed by using one computer.

The wire cut electric discharge machine has been described; however, the technical concept of the invention is applicable to a die sinking electric discharge machine with the same effects.

Figure 8:
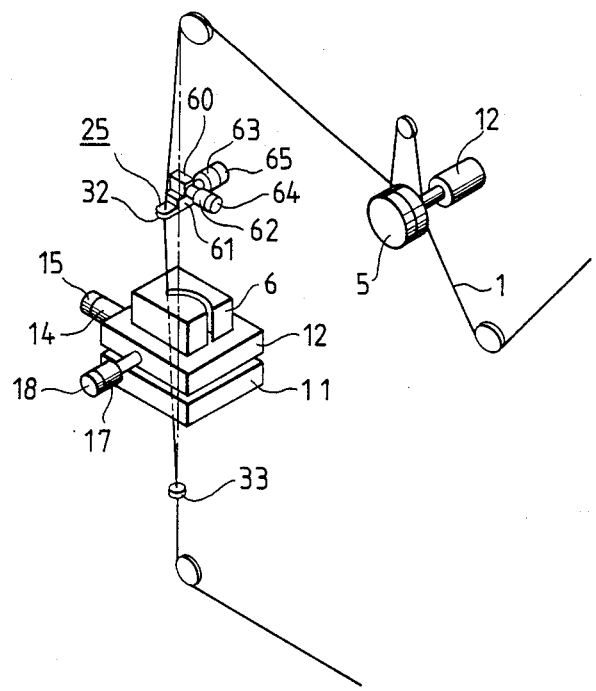
FIGS. 8 and 9 show a second embodiment of the invention.
Figure 9:
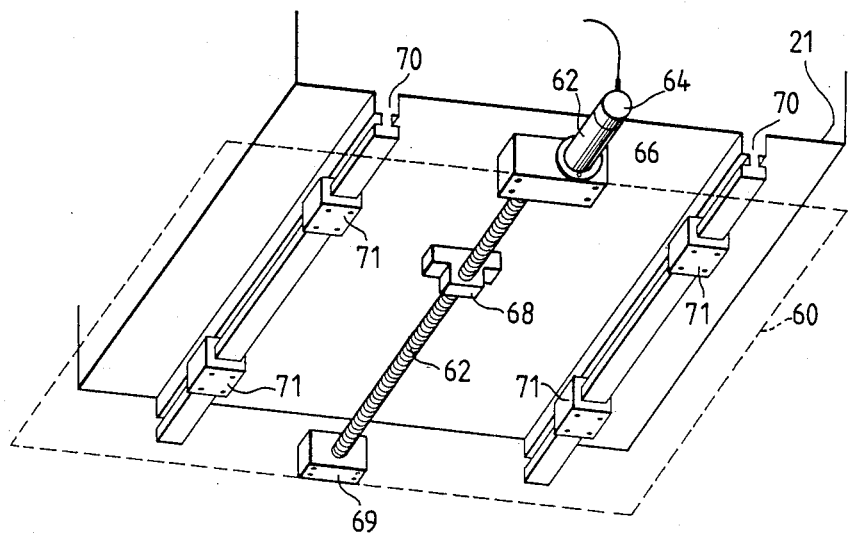

FIGS. 8 and 9 shows another embodiment of the invention. In FIGS. 8 and 9, reference numeral 25 designates a taper machining device which is equal to the device shown in the first embodiment described above. The taper machining device 25 comprises: a U-table 60 for moving the wire electrode 1 in a horizontal plane in a U-axis direction; a V-table 61 for moving the wire electrode 1 in a horizontal plane in a V-axis direction perpendicular to the U-axis direction; a U-table driving electric motor 62; a V-table driving electric motor 63; an encoder 64 for detecting an amount of rotation of the motor 62, and an encoder 65 for detecting an amount of rotation of the motor 63.

The above-described upper wire guide 32 is supported by the V-table 61 at the end, and the V-table 61 is supported by the U-table. Therefore, as the driving motors 62 and 63 rotate, the upper wire guide 32 is moved in the U-axis direction and in the V-axis direction, so that the wire electrode forms a predetermined angle with the normal as indicated by the solid line in FIG. 8.

FIG. 9 is a perspective view of a U-table moving mechanism as viewed from obliquely below. In FIG. 9, reference numeral 66 designates a speed reducer having the input side coupled to the driving motor 62 and the output side coupled to a ball screw 67; 68, a nut engaged with the ball screw 62 and secured to the lower surface of the Z-shaft 21; 69, a holder supporting the ball screw 67 rotatably; 70, two U-table moving guides arranged, in the form of rails, on the Z-shaft 21; and 71, sliders freely movable along the guides 70. The sliders are fixedly secured to the U-table 62, which is secured to the speed reducer 66 and the holder 69.

The V-table 61 also has a moving mechanism which is fundamentally equal in construction to the U-table moving mechanism, and it is supported below the U-table 60.

The other arrangement is similar to that shown in FIGS. 1 and 2.

In a taper machining operation with the electric discharge machine thus constructed, the U-table 60 and the V-table 61 of the taper machining device 25 are moved by the U-table driving motor 62 and the V-table driving motor 63, respectively, so that the upper and lower wire electrode guides 32 and 33 are moved relative to each other; that is, the wire electrode 1 is inclined.

The movement of the upper wire electrode guide 32 in the U-axis direction will be described in more detail. FIG. 9 shows a mechanism for moving the upper wire electrode guide 32 in the U-axis direction. The U-table driving motor 62 is coupled to the ball screw 67 through the speed reducer 66 secured to the U-table 60, and the ball screw 67 is engaged with the nut 68 secured to the Z-shaft 21. Therefore, as the ball screw 67 is turned, it is moved, and therefore the U-table 60 is moved along the guides 70 together with the sliders 71. In this operation, the amount of movement of the U-table 60 is detected by the encoder 64. Even if, in this case, the U-table driving motor 62 makes a predetermined number of revolutions so that the output of the encoder 64 coincides with the U-table movement instruction, in practice the U-table may be excessively or deficiently fed depending on the accuracy of the ball screw 67 or the deformation and strain of the mechanical structures of the taper machining device 25. Furthermore, when the feed direction is reversed, the backlash of the ball screw 67 is changed, so that the amount of feed may be deviated. Therefore, in the second embodiment, similarly as in the first embodiment, correcting data are used to minimize the error in feed which is due to the change in pitch of backlash of the ball screw 67 or the deflection of the ball screw 67; that is, the correction data are used to correct the amounts of feed.

Thus, in the embodiment, according to the machining conditions, the most suitable correcting data can be selected for the correction of the amounts of feed in the directions of the drive axes, U-axis and V-axis, in which the wire electrode guides 32 and 33 are moved relative to each other, whereby the wire electrode guide 32 can be fed with high accuracy, with the result that the taper machining accuracy is improved.

In the embodiment, the following method may be employed: A strain gauge is installed near the brake roller 5, and the output of the strain gauge is utilized to detect the tension of the wire electrode 1, and the load of the mechanical structures. However, the invention is not limited thereto or thereby. For instance, the load may be detected from current in a brake motor 72 adapted to brake the brake roller 5.

INDUSTRIAL APPLICABILITY

This invention can be extensively applied to electric discharge machines such as a die sinking electric discharge machine using a die sinking electrode and a wire cut electric discharge machine using a wire electrode.

We claim:

1. An electric discharge machine in which electric discharge is caused to take place between an electrode and a workpiece which are confronted through a machining solution with each other with a small gap therebetween, to machine said workpiece, and amounts of movements of drive shafts adapted to move said electrode and said workpiece relative to each other are corrected according to correcting data which have been stored in advance, which comprises:

memory means for storing correcting data for said drive shafts in advance which have been obtained under for a plurality of different values for a plurality of different machining conditions;

selecting means for selecting desired ones of said correcting data stored in said memory means in accordance with present machining conditions; and control means for correcting, according to said correcting data selected by said selecting means, amounts of movement which are to be specified for said drive shafts during machining of said workpiece.

2. An electric discharge machine as claimed in claim 1, in which two drive shafts are provided to move said workpiece and said electrode relative to each other in two directions perpendicular to each other in a horizontal plane, said correcting data are obtained for each of said two drive shafts, and said correcting data thus obtained are stored in said memory means in such a manner that said correcting data are in plurality of pairs with respect to said two drive shafts.

3. An electric discharge machine as claimed in claim 1, in which a plurality of correcting data are stored in correspondence to loads which are applied to said drive shafts.

4. An electric discharge machine as claimed in claim 1, in which a plurality of correcting data are stored for each of temperatures which are applied to said drive shafts.

5. A wire cut electric discharge machine in which electric discharge is caused to take plate between a wire electrode and a workpiece which are confronted through a machining solution with each other with a small gap therebetween, to machine said workpiece, and amounts of movement of drive shafts adapted to move upper and lower wire guides relative to each other which support said wire electrode above and below said workpiece, respectively are corrected according to correcting data which have been stored in advance, which comprises:

memory means for storing correcting data for said drive shafts in advance which have been obtained for a plurality of different value for a plurality of different machining conditions;

selecting means for selecting desired ones of said correcting data stored in said memory means in accordance with present machining conditions; and control means for correcting, according to said correcting data selected by said selecting means, amounts of movement which are to be specified for said drive shafts during machining of said workpiece.

6. A discharge electric machine as claimed in claim 5, in which two drive shafts are provided to move said workpiece and said wire electrode relative to each other in two directions perpendicular to each other in a horizontal plane, said correcting data are obtained for each of said two drive shafts, and said correcting data thus obtained are stored in said memory means in such a manner that said correcting data are in a plurality of pairs with respect to said two drive shafts.

7. An electric discharge machine as claimed in claim 5, in which a plurality of correcting data are stored in correspondence to loads which are applied to said drive shafts.

8. An electric discharge machine as claimed in claim 5, in which two drive shafts are provided to move said workpiece and said wire electrode relative to each other in two directions perpendicular to each other in a horizontal plane, and two drive shafts are additionally provided to move said upper and lower wire electrode guides relative to each other in two directions perpendicular to each other in a horizontal plane.

* * * * *